United States Patent [19]
Keyes et al.

[11] Patent Number: 5,137,643
[45] Date of Patent: Aug. 11, 1992

[54] CONTINUOUS SOAP SKIMMER

[76] Inventors: Wilford W. Keyes, 609 Poinciana Dr., Gulf Breeze, Fla. 32561; Jack E. Stover, 114 Fairway Dr., Daphne, Ala. 36526

[21] Appl. No.: 652,084

[22] Filed: Feb. 7, 1991

[51] Int. Cl.$^5$ .............................................. C02F 1/40
[52] U.S. Cl. .................................. 210/776; 210/122; 210/242.1; 210/242.3; 210/923
[58] Field of Search ...................... 210/776, 122, 242.1, 210/242.3, 540, 221.1, 923, 928, 242.2; 162/330, 337, 339, 30.1, 30.11, 239; 159/42

[56] References Cited

U.S. PATENT DOCUMENTS

| | | | |
|---|---|---|---|
| 3,745,115 | 7/1973 | Olsen | 210/776 |
| 4,469,170 | 9/1984 | Farmer, Jr. | 210/242.3 |
| 4,695,376 | 9/1987 | Astrom et al. | 210/122 |
| 4,892,666 | 1/1990 | Paulson | 210/923 |
| 5,021,154 | 6/1991 | Haegeman | 210/242.2 |

OTHER PUBLICATIONS

Newsletter, Summer 1986, A. H. Lundberg Associates, Inc., "Floating Soap Skimmer".

Primary Examiner—Robert A. Dawson
Assistant Examiner—Sun Uk Kim

[57] ABSTRACT

A continuous soap skimmer arranged to skim a light phase foamy or viscous material from a heavy phase liquid, the soap skimmer comprising a top float arranged to float partially or completely submerged in the light phase material, and a bottom float, arranged to float completely submerged in the light phase material, or partially submerged in the heavy phase material. The bottom float is further constructed to have a flow pipe mounted therein which is maintainable under a negative pressure. The top and bottom floats are sealed and arranged to remain afloat in their respective light and heavy phase materials despite ballasting fluctuations due to light phase material filling the soap flow path and despite variations in the densities of the respective phases. The skimmer will not sink when filled with the heavy phase liquid, nor will the skimmer weir float above the light phase material under any operating conditions.

17 Claims, 5 Drawing Sheets

CONTINUOUS SOAP SKIMMER

BACKGROUND

It is the nature of operations in the Kraft pulping industry to produce many by-product streams en route to producing a final pulp, paper, paperboard, or linerboard product. The operating efficiency of Kraft pulping mills depends heavily on the efficient operation of a processing chemical regeneration cycle, or Recovery Cycle. In this area, maintenance of a proper balance of, for example, specific chemicals in specific by-product streams, or a particular range of solids in such streams is required for efficient mill operation.

At the very beginning of the papermaking process, in a paper mill employing Kraft pulping technology, is the digester. Simply put, the digester accepts wood chips, and converts the same into usable cellulose fibers. This is done through a predetermined application of high temperatures and pressures, and various chemicals (for example, sodium hydroxide) in a water based solution. The primary waste stream from the digester is the pulp stream (washed cellulose fibers in a water suspension), and the secondary, or waste stream, is the black liquor stream, which is an aqueous stream containing the spent processing chemicals and various by-products produced by the Kraft Digestion process.

Black liquor leaving the digestion (or pulp production) area of the process is referred to as Weak Black Liquor, and typically contains various dissolved organic and inorganic solids in the range of 12-18 percent by weight. At this dissolved solids content (particularly at the upper end of this range) a by-product precipitate forms which is called Crude Tall Oil Soap. This soap has a bulk density which is typically lower than that of the Black Liquor at this point in the Recovery Process. The soap density range can be between approximately 0.5 to 9.0 pounds per gallon, dependent upon the amount of air and black liquor contained in the soap mass. Soap of this type, having a bulk density of less than 1 pound per gallon, is considered to be foam, or very light soap.

The Weak Black Liquor and precipitated Crude Tall Oil Soap mixture is typically sent to an interim Weak Black Liquor Storage Tank, of sufficient volume to allow for reasonable process flow variations. These tanks are typically rather large (100,000 to 1,000,000 Gallons), and the rather static conditions that exist in them allow the precipitated soap to separate from the black liquor, and rise to the surface of the black liquor in the tank, thus forming a layer of soap on top of the liquor. This soap layer can be several feet thick in a typical Weak Black Liquor Storage Tank.

When soap rises to the top of the black liquor in the Weak Black Liquor Storage Tank, a natural density gradient occurs within the soap mass. This gradient is typically proportional to the percentages of air and black liquor contained in the soap, producing a light soap at the top of the soap mass, and a heavier soap at the soap/liquor interface. The density, nature and consistency of soap will vary depending upon the percentages of air and black liquor entrained in the soap. For example, when soap is heavily laden with black liquor, it becomes more like black liquor in terms of its flow characteristics. Conversely, when soap is relatively free of black liquor (for example 2-5% by weight, black liquor) the soap become viscous, sticky, sometimes lumpy and difficult to move. As a result, soap with low black liquor content may clog pipes, valves and soap recovery or removal equipment.

Soap masses in Weak Black Liquor Storage Tanks can become so large, that they represent a processing hazard, or deterrent, in several ways. A large, relatively low density, soap mass can limit black liquor storage capacity, which limits the flexibility of operation, and usually results in environmentally hazardous soap spills. If the soap mass in the tank is allowed to deaerate, and become as dense as the parent Weak Black Liquor in the tank, the soap will sink into the liquor mass, and enter the subsequent evaporation operation. Soap in liquor fed to Black Liquor Evaporators, will completely disrupt the evaporator operation. It is imperative, therefore, that the by-product soap be removed from the Weak Black Liquor Stream as efficiently as possible, before reaching the evaporators. The largest volume of soap can be separated most efficiently from the Weak Black Liquor stream at the Weak Black Liquor Storage Tank system. Separation or recovery of the soap at this point has to date been severely hindered by a lack of equipment and/or techniques to do the job satisfactorily.

PROBLEMS WITH PRIOR ART SOAP SKIMMERS

Prior art soap removal and/or recovery from the Weak Black Liquor Storage Tank system has taken many forms. One early means of soap removal involved overflowing the tank to the sewer. With a need today to be more environmentally conscious, this is no longer acceptable. Later methods of soap removal involved installation of manifold outlets on the sides of the tank, with pumps to remove the soap. This method is not effective, since the soap/liquor interface in these Weak Black Liquor Storage Tanks is quite variable during normal mill operation. Operators cannot see inside the tanks to determine when soap may be present at any of the manifold valves, and no practical means were available to get this information. This method is also impractical, since the soap flow characteristics are very poor. The soap tends to deaerate, increasing its density, to a point where it may sink in the liquor mass, where it can be pumped to the subsequent evaporation systems. Evaporator systems in the Kraft paper mills do not operate at optimum efficiency when fed this type of material. In fact, the feeding of soap laden liquor to such an evaporator system causes severe operational problems. For example, such problems may include plugging of evaporator tubes or heater units, and adverse operating effects on the furnace or recovery boiler system in the pulp mill.

Another method for recovering soap from these liquor tanks is to operate several tanks in series, with one of them (a dedicated soap skim tank) operated full to allow soap to overflow continuously to a recovery tank. This works well, but is very expensive, limits storage capacity, and requires an expensive mechanical "Stand Pipe" soap/liquor interface controller to maintain a minimum soap "head" on the dedicated soap skim tank.

The prior art for floating soap skimmers employs a buoyancy technology using a single floating assembly, typically loaded with a fixed ballast medium such as cast lead, or lead pellets. The lead provides the weight necessary to partially submerge the floating assembly in the black liquor, thus allowing light soap to flow into the opening of the soap recovery pipe, located at the top of the floating assembly. The quantity of lead ballast is usually fixed. The floating assembly is also typically arranged to hold an additional medium, usually a liquid such as water, to adjust the ballast of the unit to allow the top, or inlet point of the unit, to float at some minimum distance above the soap/liquor interface. The volume of this liquid medium can be varied to force the floating skimmer up or down as required to adjust its skimming point, but the results of the adjustment cannot be observed while the Kraft Recovery Process is operating.

The floating assembly typically comprises a hollow chamber, such as one with a concentric flowpath mounted therein. The hollow section of the chamber is usually equipped to be partially filled with the water for ballast.

The recovery line, from the floating soap skimmer unit to the side of the tank must be a relatively large line to assure that it will not plug with viscous soap. This line typically represents more buoyancy than that of the float assembly itself. This causes the buoyancy of the assembly to vary dramatically as the media in the transfer line changes from air, through various soap densities, to black liquor. This buoyancy change, in turn, causes the skimmer unit to float well above the soap mass (thus collecting no soap) if it is lightly ballasted, and to sink in the black liquor (to the tank bottom) if it is heavily ballasted. Intermediate ballasting causes the skimmer unit to float high in the soap mass, allowing deaeration of the soap below its inlet, and eventual collection of a large volume of high density soap in the tank that floats the skimmer unit above it, thus collecting no soap.

A major problem with such a floating skimmer assembly design is that there is no acceptable way to continually adjust its buoyancy for optimum soap recovery while the Kraft Recovery Cycle is operating, and once operation is begun, the density of the soap being recovered varies continuously. This causes the buoyancy of the floating assembly to vary due to the varying density of the media (soap) in its long recovery line. This usually causes the unit to float lower in the black liquor mass until its inlet goes below the soap/liquor interface. Flow of pure black liquor into the soap inlet typically causes over ballasting of the assembly, causing it to sink.

Many users of the prior art systems operate their floating assemblies in a manner which allows them to determine when the soap layer is exhausted by visually inspecting for black liquor flow, or by the use of discrete sensors, for example viscosity indicators. Additionally, the floating assembly of the prior art has been designed to float only on the black liquor. As with the other units, the buoyancy characteristics of the floating assembly can tolerate only relatively small variations in liquor density, or total buoyancy, without adjustments in the amount of water or lead ballast in the float. These latter units usually floated too high, causing a buildup of heavy soap in the liquor tank that was heavy enough to float the units themselves. Thus little or no soap was collected.

SUMMARY OF THE INVENTION

The continuous soap skimmer comprises at least one top float and a bottom float, the top float arranged to remain at least partially submerged in a layer of soap, floating therein. The bottom float is arranged to remain floating in soap, or floating partially submerged in a layer of black liquor. A weir opening is contained in the bottom float, the weir opening comprising the beginning of a soap flow pipe. The top and bottom floats are connected by at least one lower hanger plate which is arranged to provide a predetermined distance therebetween. When the skimmer uses two top floats an upper hanger plate is used to connect the floats. The continuous soap skimmer operates to draw soap into the weir opening by a vacuum which is maintained in the soap flow pipe.

The soap skimming system incorporates the skimmer into a system including first and second ball joints coupled to the respective ends of a swing arm, providing for continuous soap flow therethrough, and further through a connector pipe for further processing. Automatic on-off control of the soap flow pump may be accomplished with electronic switching, responding to signals from a preset viscosity probe located in the downstream connector piping system. The system may alternatively include first and second detection means to detect soap and black liquor levels relative to predetermined positions on the top and bottom floats. Signals from the first and second detection means may then be sent to a controller for further control of the process, such as, for example the flowrate of the pump.

DETAILED DESCRIPTION

Figure 1:
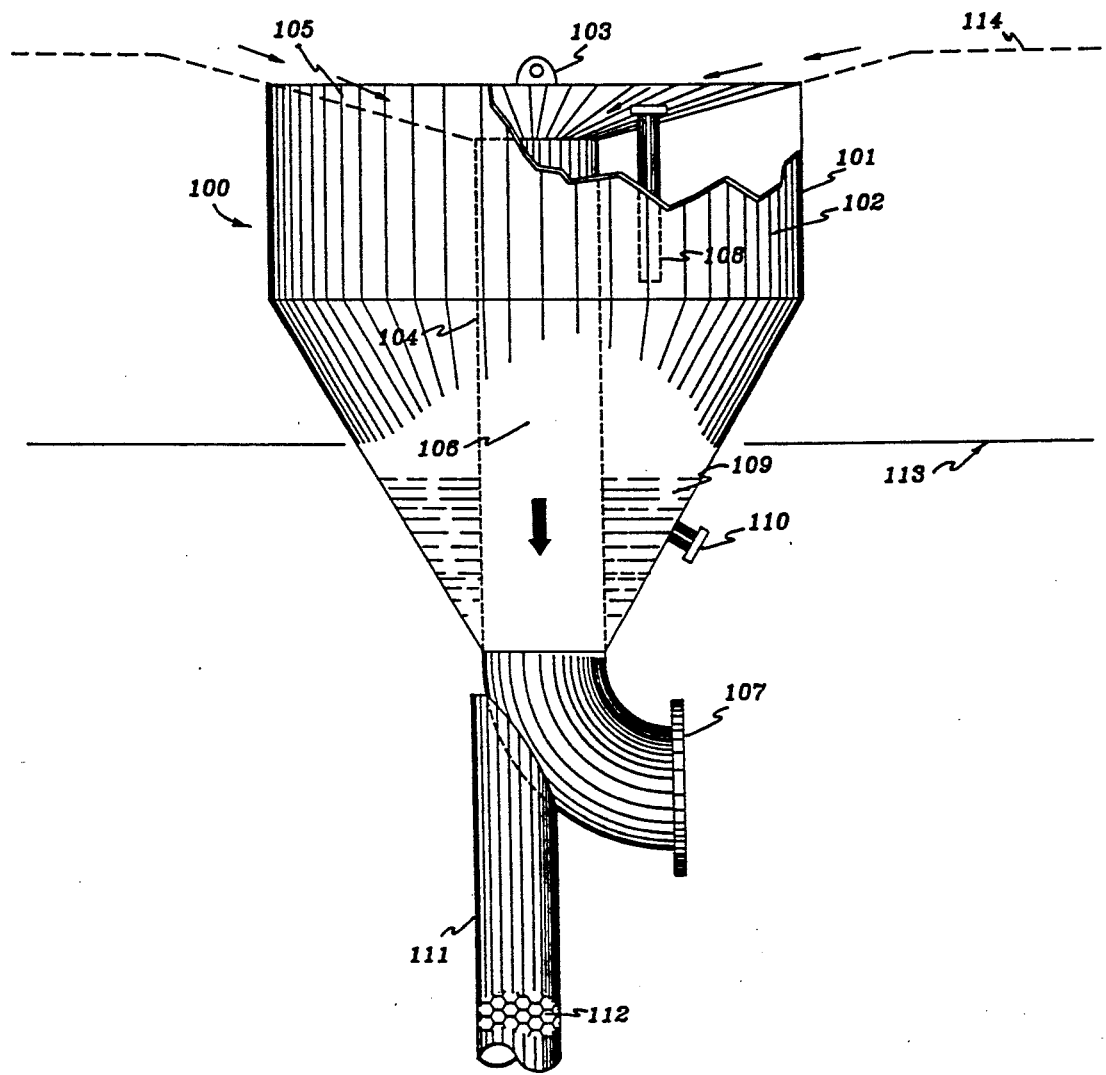
FIG. 1 is an illustration of a prior art floating assembly.

Referring to FIG. 1, an illustration of a prior art soap skimmer, a floating assembly 100 is shown. The floater assembly 100 comprises a floater chamber 101 having a hollow portion 102 therein. The floating assembly 100 further comprises a hanger eyelet 103 such that the assembly 100 can be supported by a hanger wire, if necessary. A soap pipe 104 is positioned in the hollow portion 102 of the floater chamber 101 such that soap can flow into a top portion 105 of the floater chamber 101 and through a soap pipe path 106 before exiting the floater chamber 101 at the soap outlet 107. The floating assembly 100 is also equipped with the necessary components for filling and draining the hollow portion 102 with water. For example, a filler pipe with plug 108 is mounted in the floater chamber 101, extending into the hollow portion 102 for filling the chamber 101 with water for the purpose of adding weight to the assembly 100. A water level 109 is thereby maintained in the chamber 101. A drain plug 110 is also mounted to the chamber 101 such that the water level 109, and therefore the weight of the assembly 100 can be reduced. The water addition is merely to supplement the weight provided by a ballast container 111 filled with a filling medium 112 such as, for example, lead pellets.

The prior art floating assembly 100 as in FIG. 1 is designed to float on a black liquor level 113 in a tank. The floating assembly 100 sits partially submerged in the black liquor, the degree of the assembly 100 being submerged being dependent upon the amount of filling medium 112 and water 109 in the assembly 100.

The soap level 114 must remain slightly higher than top portion 105 of the floater chamber 101 to ensure continuous soap flow into the soap flow path 106. Adjustment to the weight of the floating assembly is required for optimum performance. By maintaining the floating assembly at a weight which allows the top portion of the floater chamber 105 to approach the black liquor level 113, the user risks the possibility of allowing the unit to ingest black liquor. It is typical for such floating assemblies 100 to further include some means to maintain a vacuum in the soap flow path 106, usually by way of an external pump.

Also, the prior art floating assembly 100 can be weighted down to the extent that it will accept all black liquor and possibly sink as a result. Alternatively, the floating assembly can be maintained at particular heights by attaching a hanger wire to the hanger eyelet 103 and raising or lowering the assembly 100 as needed.

THE PRESENT INVENTION

Figure 2:
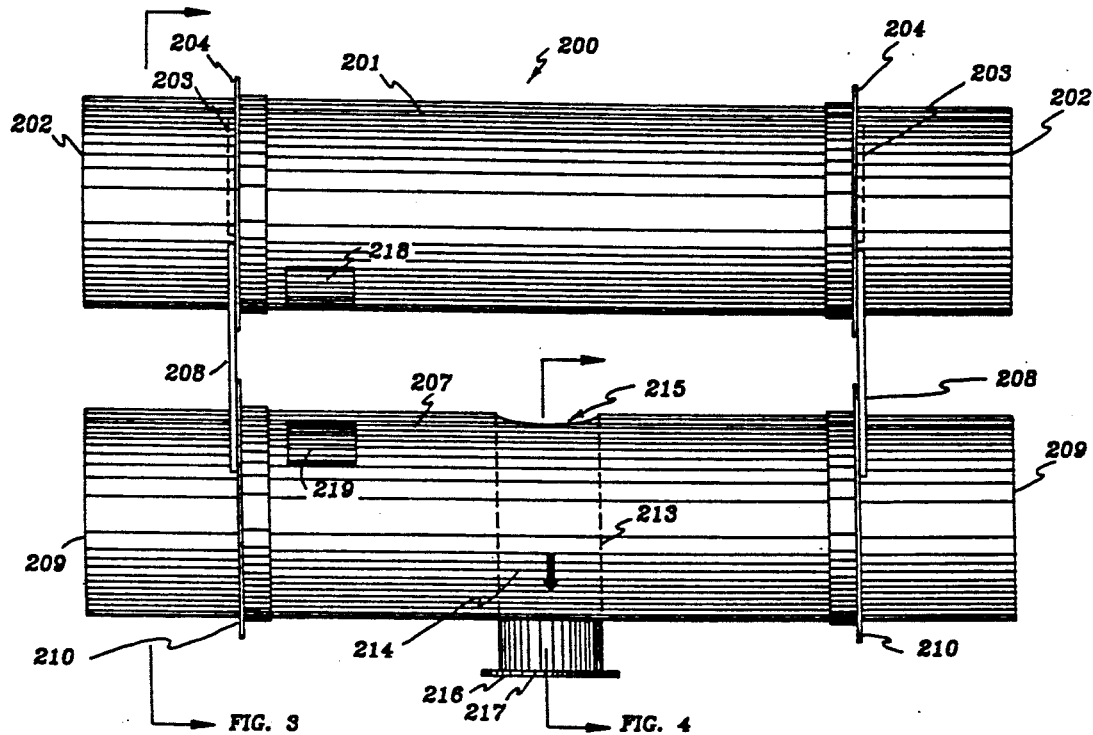
FIG. 2 is a side view illustration of the continuous soap skimmer of the present invention.
Figure 3:
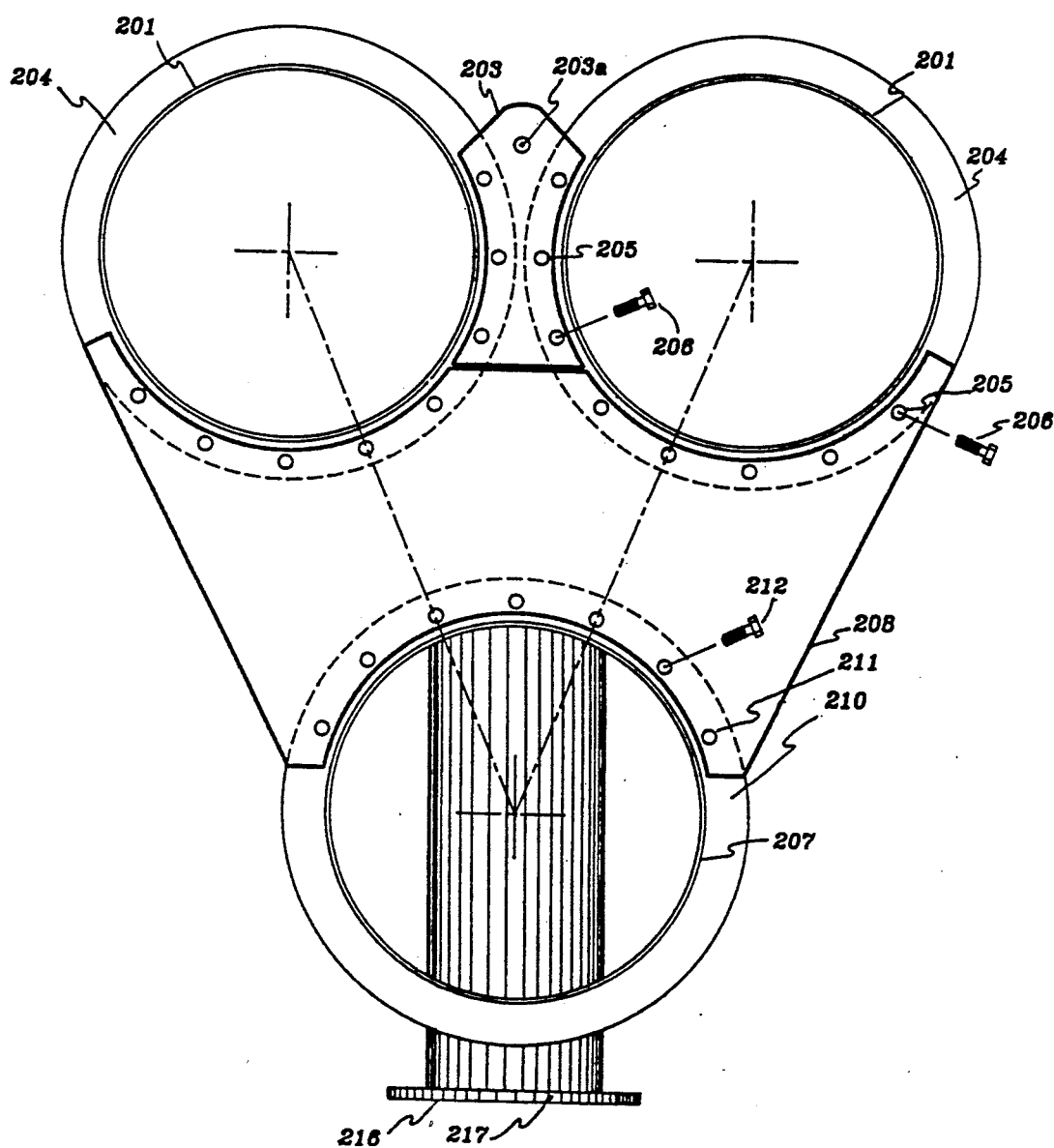
FIG. 3 is a front view illustration of the continuous soap skimmer of the present invention.
Figure 4:
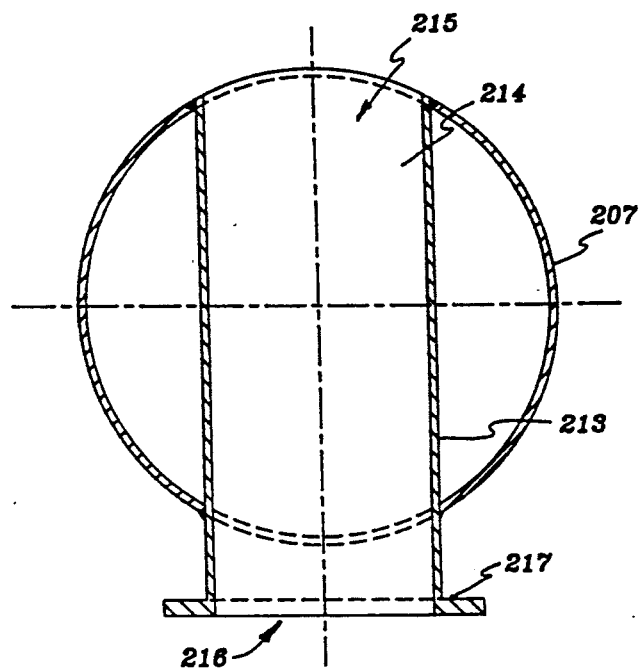
FIG. 4 is an illustration of the cross-section of the continuous soap skimmer showing the soap flow pipe.

Referring to FIGS. 2 through 4, the Continuous Soap Skimmer side and front views and the cross section of the Skimmer Weir Opening, respectively are shown. The Skimmer assembly 200 comprises at least one top float 201. It is preferable to construct the skimmer assembly 200 with at least two top floats 201 for balance considerations, and to prevent the skimmer assembly from twisting or attempting to roll over. The top float 201 is constructed to remain at least partially submerged in the soap layer. The top float 201 may even be completely submerged in a very light soap or foam layer.

The top float is preferably of a cylindrical construction with top float end caps 202 on each end. Other shapes for the top float 201 are also acceptable. These end caps 202 are preferably secured to the top float 201 by welding, or may be secured by other means as long as the mounting of the end caps 202 creates an air-tight and water-tight fit to the top float 201. The top float 201 seal must be maintained during normal operation.

The size of the top float, in terms of cylinder diameter and cylinder length is a function of buoyancy considerations of the assembly 200 in the soap. The range of soap densities must be considered such that the top float 201 will remain at least partially submerged in the soap over its complete density range.

When the skimmer assembly 200 includes two or more top floats 201, each top float 201 is coupled to the adjacent top float 201 by an upper hanger plate 203. The upper hanger plate 203 may be affixed to the respective top floats 201 by a variety of means. For example, as shown in FIGS. 1 and 2, the top floats 201 may each be equipped with an upper hanger ring 204. The upper hanger ring 204 is fixedly mounted to the top float 201 at or near each end thereof. The upper hanger ring 204 may comprise a flange-type construction with a flange face having pre-bored holes 205 (or pre-tapped holes). The upper hanger plate 203 would then have corresponding holes aligning with the flange holes 205 for which to insert a bolt 206. Alternatively, the upper hanger plate 203 may be welded to the respective top floats 201 without the need for the upper hanger ring 204.

The upper hanger plate 203 may have a hole 203a to accept a hanger wire should the skimmer assembly 200 ever need to be lifted out of a tank for service or inspection, or to support the assembly in an empty tank.

The skimmer assembly further comprises a bottom float 207. The bottom float 207 is designed to float below the soap surface, or to remain partially submerged in the black liquor, such that a weir opening 215 in the bottom float 207 remains positioned below the soap surface, but above the soap/black liquor interface in a tank. The bottom float 207 is coupled to the top float 201 by a lower hanger plate 208. The lower hanger plate 208 is affixed to the upper hanger ring 204 by means substantially similar to the connection of the upper hanger plate 203 to the upper hanger ring 204.

The lower hanger plate 208 is also affixed to the bottom float 207 in a substantially similar manner as that used to affix the upper hanger plate 203 to the top float 201. Specifically, the bottom float 207 comprises lower hanger rings 210, located at appropriate distances from the ends of the bottom float 207. The lower hanger rings 210 may comprise a flange-type construction with each having a flange face having pre-bored holes 211 (or pre-tapped holes). The lower hanger plate 208 would then have corresponding holes aligning with the flange holes 211 for which to insert a bolt 212. Alternatively, the lower hanger plate 208 may be welded to the bottom float 207 without the need for the lower hanger ring 210.

The lower hanger plate 208 is sized to allow for a first predetermined distance between the top of the bottom float 207 and the bottom of the top float 201. This first predetermined distance may be a function of the desired soap level in the tank, soap flow restriction considerations, or physical obstructions in the tank.

The lower hanger, plate 208 may also be adapted to be modifiable with respect to the first determined distance.

The bottom float 207 is also illustrated to be of cylindrical construction although, like the top float 201, the bottom float 207 may be constructed in other geometric configurations, such as, for example, circular, annular, triangular or rectangular configurations. Also, the bottom float 207 is a sealed component with bottom float end cap 209 secured to each end of the bottom float 207 in a substantially similar fashion to that used to secure the top float end caps 202 to the top float 201.

As shown in FIGS. 2 and 4, the bottom float 207 is arranged to accept a soap flow pipe 213 fixedly mounted inside the cylinder comprising the bottom float 207. Specifically, the soap flow pipe is coupled to the top of the bottom float 207 by welding the soap flow pipe 213 to the cylinder comprising the bottom float 207. Similarly, the soap flow pipe 213, while extending through the bottom float 207 on its bottom side, is welded to the bottom float 207. Since the bottom float 207 is a sealed component, all welding must be completed so as to provide for an air-tight and water-tight seal.

The soap flow pipe 213 provides a soap flow path 214, within the bottom float 207 beginning with the weir opening 215 and ending with the soap outlet 216. The bottom float 207 may further comprise a flange 217 connected to the soap flow pipe 213 to facilitate coupling of the skimmer assembly 200 with additional piping.

The diameter of the soap flow pipe 213, and therefore of the weir opening 215 is sized to accommodate the desired flow of tall oil soap through the soap flow pipe. Operationally, weir openings 215 less than six (6) inches tend to promote plugging of the weir opening 215 and/or the soap flow pipe 213. Since the soap flow pipe 213 is maintained under a vacuum during normal operation, the weir opening 215 must not be made too large, otherwise excessive flotation weights and vacuum pump requirements would be encountered. The largest practical weir limit would be the diameter of the bottom float 207, as well as the diameter of the piping to the soap feed pump 508.

Depending upon the specific application of this assembly and the operating conditions encountered, any of the following components can also be constructed of carbon steel, stainless steel or any number of plastics: the top float 201; and the bottom float 207; the upper hanger plate 203 and the lower hanger plate 208.

THE SOAP SKIMMING SYSTEM

Figure 5:
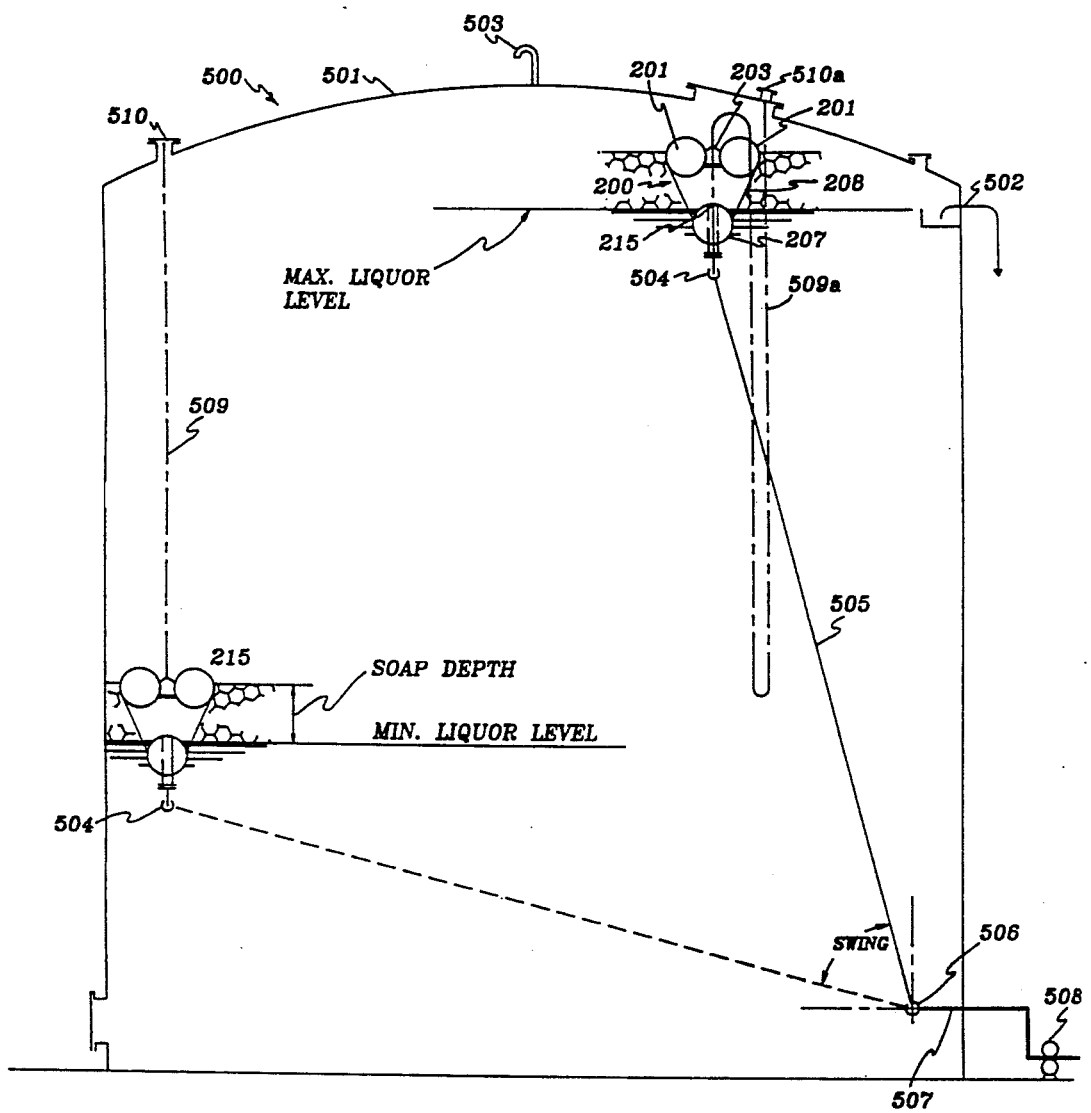
FIG. 5 is an illustration of a skimming system with the continuous soap skimmer of the present invention.

Referring to FIG. 5, the Skimmer assembly 200 is shown is a system configuration. The soap skimming system 500 comprises a tank 501 having an overflow opening 502, a vent 503, the skimmer assembly 200, a first ball joint 504, a swing arm 505, a second ball joint 506, a connector pipe 507 and a pump 508. The skimming system 500 may further comprise wire hangers 509 and 509a coupled to the skimmer assembly 200 and extending through the tank 501 via hanger wire openings 510 and 510a.

The skimmer assembly 200 is coupled to the first ball joint 504, the first ball joint 504 then being coupled to the swing arm 505. Each of the first ball joint 504 and the swing arm 505 are arranged to allow for tall oil soap flow therethrough.

The swing arm 505 is arranged, for optimal performance to move from an extreme low position, which is substantially horizontal, to an extreme high position of approximately 15° from vertical. The swing arm 505 is coupled to the second ball joint 506, the second ball joint 506 being further coupled to a connector pipe 507 which extends through the tank 501 to a pump 508. Each of the second ball joint 506, the connector pipe 507 and the pump 508 is arranged to allow for continuous soap flow therethrough. In lieu of discrete ball joints 504 and 506, the soap skimming system 500 may comprise flexible piping suitably coupled to the skimmer assembly 200, swing arm 505 or connector pipe 507.

The pump 508 is of a positive displacement or progressive cavity type whereby a vacuum is created throughout the soap skimming system 500 extending from the weir opening 215 to the pump 508 inlet. The pump 508 is sized to accommodate the desired flow of tall oil soap at the desired negative pressures. The negative pressure at the weir opening should be no less than that required to move soap to the transfer pump 508 at prescribed rates.

It may also be desirable to equip the pump 508 with a variable speed drive, such as a variable frequency motor, to accommodate a range of flowrates at the desired negative pressures.

The soap skimming system 500 operates to allow for the skimmer assembly 200 to float, with the bottom float 207 at least partially submerged in the black liquor and with the top float 201 either partially, or fully submerged in soap/foam. The skimmer assembly 200 will operate optimally without regard to whether the top float 201 is partially or fully submerged A viscosity probe may be located at a convenient point beyond the swing arm 505 and used in conjunction with electronic switching to actuate the soap flow pump. A viscosity sensing device and a timed delay switch have been found adaptable for this purpose.

Referring again to FIG. 2, alternatively, for the purpose of early detection of such soap levels, a first detection means 218 may be affixed to the top float 201. This first detection means 218 may be used to detect the presence of soap at a predetermined point at or near the bottom of the cylinder comprising the top float 201. The first detection means 218 may comprise a conductivity monitoring device arranged to send a signal upon a predetermined reduction in conductivity, indicative of the conductivity monitoring device losing contact with the soap layer. The soap skimming system 500 may be adapted with known controller means to receive the signal indicating the first detection means 218 loss of contact with the soap layer, and either shut down the pump 508 or continue the pump 508 operation for a predetermined period of time. This decision may be a function of the tank 501 size and the first predetermined distance between the top float 201 and the bottom float 207, since these factors contribute to the volume of tall oil soap present between the top and bottom floats, 201 and 207 respectively.

Referring back to FIG. 2, the skimmer assembly 200 may further comprise a second detection means 219 to detect black liquor levels above the height of the weir opening 215. Without such detection means 219, black liquor could fill the soap flow path 213 when upset conditions arise such as, for example when an obstruction prevents the top and bottom floats, 201 and 207 respectively, from rising with the rise in soap and black liquor levels. The second detection means 219 may again comprise a conductivity monitoring device such as arranged to send a signal to known controller means upon a predetermined increase in conductivity coincident with the conductivity differential between soap and black liquor to control the pump 508.

The second detection means 219 may be electrically coupled to known control devices to shut off the pump 508 when the aforementioned signal is sent by the detection means 218.

The height of the tank overflow 502 should align in the horizontal with a point just above the maximum height of the weir opening 215 when the skimmer assembly 200 is raised to its maximum height inside the tank 501.

The soap skimmer assembly will not sink if the weir passage and associated piping become filled with liquor, since the magnitude of buoyancy of the top floats 201 will maintain flotation on the liquor at the soap/liquor interface. Likewise, the magnitude of the buoyancy of the total skimmer system will not allow the skimmer weir to float above the soap level under any operating conditions. Further, the skimmer will recover soap over a wide density range, typically in the range of 2 to 9 pounds per gallon.

In light of the foregoing disclosure it is evident that the continuous soap skimmer is applicable to more than pulp and paper mill by-product recovery processes. In fact, the continuous soap skimmer may be employed in any skimming operation wherein a foamy and/or relatively viscous light phase component is to be skimmed from a heavy phase liquid having a sufficient density differential to enable the continuous soap skimmer to operate.

We claim:

1. A continuous soap skimmer comprising:

at least one top float adapted to float at least partially submerged in a light phase fluid;

a bottom float adapted to be partially submerged in a heavy phase fluid, the bottom float having a flow pipe fixedly mounted therein, the bottom float also having a weir opening; and first and second lower hanger plates each lower hanger plate coupled directly to the top float and the bottom float the first and second lower hanger plates arranged to provide a predetermined distance between the top float and the bottom float, whereby the light phase fluid may fill the area between the top and bottom floats and continuously flow into the weir opening and down through the flow pipe.

2. The continuous soap skimmer of claim 1 wherein the top float and the bottom float each comprise a sealed cylinder.

3. The continuous soap skimmer of claim 1 wherein the weir opening is at least six (6) inches in diameter.

4. The continuous soap skimmer of claim 1 wherein the flow pipe is maintained under a vacuum.

5. The continuous soap skimmer of claim 1 wherein an upper hanger plate connects a first top float to a second top float.

6. The continuous soap skimmer of claim 1 wherein the predetermined distance between the top float and the bottom float is variable within a predetermined range of distances.

7. The continuous soap skimmer of claim 1, wherein the soap skimmer will remain afloat when the flow pipe is filled with the heavy phase fluid.

8. The continuous soap skimmer of claim 1, wherein the skimmer weir will remain submerged in the light phase fluid under all operating conditions.

9. A soap skimming system to continuously skim a light phase fluid from a heavy phase fluid comprising:

at least one top float at least partially submerged in the light phase fluid;

a bottom float adapted to be partially submerged in a heavy phase fluid, the bottom float having a flow pipe fixedly mounted therein, and extending therethrough, the bottom float also having a weir opening;

first and second lower hanger plates arranged to couple directly the top and bottom floats and further adapted to provide a predetermined distance between the top float and the bottom float;

a first ball joint coupled to the flow pipe and adapted to allow for continuous light phase fluid flow therethrough;

a swing arm pivotably coupled to the first ball joint at a first end and also pivotably coupled to a second ball joint at a second end and adapted to allow for continuous light phase fluid flow therethrough; and a connector pipe coupled at one end to the second ball joint and at the other end to an inlet of a pump, the connector pipe extending through a tank wall, whereby the light phase fluid may fill the area between the top and bottom floats and continuously flow into the weir opening, and down through the flow pipe, the first ball joint, the swing arm, the second ball joint and the connector pipe.

10. The soap skimming system of claim 9 wherein the swing arm pivots from its second end such that the swing arm moves freely between a low position which is substantially horizontal and a high position of slightly less than vertical.

11. The soap skimming system of claim 10 wherein the top float comprises first detection means to detect when the top float is not sufficiently submerged in the light phase fluid.

12. The soap skimming system of claim 11 wherein a signal from the first detection means is received by a controller, whereby the controller operates to adjust the flow of light phase fluid through the soap skimming system.

13. The soap skimming system of claim 10 wherein the bottom float comprises second detection means to detect when the bottom float is submerged too deeply in the heavy phase fluid.

14. The soap skimming system of claim 13 wherein a signal from the second detection means is received by a controller, whereby the controller operates to stop the flow of light phase fluid through the soap skimming system.

15. A method of operating a soap skimming system to continuously skim soap from atop a black liquor layer in a tank, the method comprising the steps of:

providing a top float adapted to float at least partially submerged in a layer of soap;

providing a bottom float adapted to be partially submerged in the layer of black liquor, the bottom float having a soap flow pipe fixedly mounted therein, the bottom float also having a weir opening;

coupling directly the top and bottom floats together by affixing at least one lower hanger plate to the top float and to the bottom float maintaining a predetermined distance between the top and bottom floats;

maintaining a vacuum in the soap flow pipe;

operating the soap skimming system to skim the soap by pulling the soap into the weir opening and through the soap flow pipe; and transporting the soap through additional piping between the soap flow pipe and a pump.

16. The method of claim 15 further comprising the steps of;

detecting when the bottom float is submerged in the layer of black liquor to a predetermined level lower than the height of the weir opening; and stopping the pump, thereby stopping the flow of soap through the soap skimming system.

17. A continuous soap skimmer comprising:

at least one top float adapted to float at least partially submerged in a light phase fluid;

a bottom float adapted to be partially submerged in a heavy phase fluid, the bottom float having a light phase flow pipe fixedly mounted therein, the bottom float also having a weir opening; and hanger means coupled directly to the at least one top float and the bottom float, and adapted to provide a predetermined distance between the at least one top float and the bottom float, whereby the light phase fluid may fill the area between the top and bottom floats and continuously flow into the weir opening and down through the light phase flow pipe.

* * * * *